(12) United States Patent
Horbaschek

(10) Patent No.: US 7,184,871 B2
(45) Date of Patent: Feb. 27, 2007

(54) DISTRIBUTED CONTROL UNIT

(75) Inventor: Mirko Horbaschek, Wurzburg (DE)

(73) Assignee: DaimlerChrysler AG, Stuttgart (DE)

( * ) Notice: Subject to any disclaimer, the term of this patent is extended or adjusted under 35 U.S.C. 154(b) by 628 days.

(21) Appl. No.: 10/737,020

(22) Filed: Dec. 16, 2003

(65) Prior Publication Data

US 2004/0158379 A1     Aug. 12, 2004

(30) Foreign Application Priority Data

Dec. 16, 2002   (DE) ............................... 102 58 753

(51) Int. Cl.
*G05D 1/00*      (2006.01)
(52) U.S. Cl. .............................. 701/48; 701/32; 701/36
(58) Field of Classification Search .............. 701/1–14, 701/29, 30, 32, 35, 36, 48, 33; 340/7.3–7.41
See application file for complete search history.

(56) References Cited

U.S. PATENT DOCUMENTS

| | | | | |
|---|---|---|---|---|
| 6,175,789 B1 * | 1/2001 | Beckert et al. | ................ | 701/33 |
| 6,411,884 B1 | 6/2002 | Chutorash | | |
| 6,643,571 B2 * | 11/2003 | Gotvall et al. | ................ | 701/33 |

FOREIGN PATENT DOCUMENTS

| | | |
|---|---|---|
| DE | 4445110 | 6/1996 |
| DE | 19814242 | 7/1999 |
| DE | 19832531 | 2/2000 |
| DE | 19842064 | 3/2000 |
| DE | 10044934 | 4/2000 |
| DE | 19915253 | 10/2000 |
| DE | 19963610 | 11/2000 |
| DE | 19933688 | 12/2000 |
| DE | 10008455 | 8/2001 |
| DE | 10042377 | 3/2002 |

* cited by examiner

*Primary Examiner*—Richard M. Camby
(74) *Attorney, Agent, or Firm*—Crowell & Moring LLP

(57) ABSTRACT

Data bus system having a plurality of control units (1) which interchange messages with one another via a data bus (2) and which are provided for controlling components, the individual control units (1) being of modular design and being fitted in different installation spaces in a technical product, characterized in that the control units (1) are designed as distributed control units having individual modules (3, 4, 5a, 5b, 6), a plurality of which can be arranged independently of one another and some of which are connected via an internal data bus (7), and the individual modules (3, 4, 5a, 5b, 6) in a control unit produce data and signals for driving the same component/components (8, 9, 10, 11) with individual modules identical in terms of hardware being provided in different control units (1), and in that at least two different types of individual modules (3, 4, 5a, 5b, 6) are provided in a plurality of control units (1), with one output-stage individual module (5a, 5b) provided in a plurality of control units (1) being provided for the purpose of driving actuators and another logic individual module (4, 6) using a logic circuit or a microcomputer to produce digital input and output signals from digital information.

19 Claims, 2 Drawing Sheets

DISTRIBUTED CONTROL UNIT

CROSS-REFERENCE TO A RELATED APPLICATION

This application claims the benefit of the filing date of German Patent Application Serial No. 102 58 753.1-34, filed on Dec. 16, 2002.

BACKGROUND AND SUMMARY OF THE INVENTION

The invention relates to a data bus system having a plurality of control units which interchange messages with one another via a data bus and which are provided for controlling components, the individual control units being of modular design and being fitted in different installation spaces in a technical product. Such data bus systems are preferably used in means of transport such as motor vehicles, ships and aircraft. Data bus systems are also used in complex machines, however.

German reference DE 198 32 531 A1 discloses a data bus system having a plurality of control units for controlling electrical loads in a motor vehicle. In this case, a load module is provided in which firstly the electrical load, i.e. the technical component, and secondly the control unit itself are arranged. The load module is mounted as a whole in an installation space in the motor vehicle. In this case, a complete control unit with the interface for the data bus, for example a CAN data bus, is used. The load module with the complete control unit can be delivered as a whole by the supplier to the motor vehicle manufacturer, where it can be fitted as a complete load module. In connection with engines, there is the drawback that the control unit needs to be designed to be insensitive to relatively high temperatures and other environmental conditions, which results in high costs. On the other hand, a relatively large installation space needs to be provided in the vehicle interior, for example, if the entire load module with the complete control unit needs to be mounted in the region of a window-lifter electric motor, for example. Since each load module is provided with a specific control unit, usually provided by the supplier, each load module is delivered with a different control unit having different hardware. This complicates maintenance, fault recognition and also future spares requirements, in particular, since there are a large number of different control units in one motor vehicle.

German reference DE 44 45 110 A1 shows a circuit arrangement for a motor vehicle having various functional modules. In, this case, the functional modules are sensors or actuators, such as electric motors, displays or control elements. A central control unit is provided for driving these sensors and actuators and, to allow the circuit arrangement to be extended more easily, the central control unit has interfaces to which the various functional modules can be coupled. This means that the circuit arrangement is easy to extend. In the case of this circuit arrangement too, a plurality of different control unit types are provided for the control units used.

U.S. Pat. No. 6,411,884 discloses a data bus system for a means of transport in which individual control units are arranged in different installation spaces and are connected to one another via a data bus. In this case, individual control units can be provided in the form of plug-in cards which can be inserted into insert openings provided for this purpose in a control unit housing in the boot of a motor vehicle. The installation space in the boot for the various control units ends up being large, since a plurality of control units need to be provided at this location. On the other hand, each control unit is in the form of a card and is provided with different electrical circuits, such as are usual for the specific control task.

It is an object of the present invention to develop a data bus system having a plurality of control units of the type mentioned at the outset such that an increased component-sharing concept for the control-unit hardware results in lower costs for fault correction and spares provision. In addition, the data bus system and, in particular, the control units need to be designed such that individual modules can be arranged in distributed fashion in very small installation spaces within the means of transport.

Accordingly, the control units are designed as distributed control units having individual modules, a plurality of which can be arranged independently of one another and some of which are connected via an internal data bus, and the individual modules in a control unit produce data and signals for the purpose of driving the same component or components. In relation to the hardware, identical individual modules are provided in different control units, and at least two different types of individual modules are arranged in a plurality of control units. One type of individual module is an output-stage individual module, which is required for the purpose of driving actuators, such as electric motors and actuating elements, inter alia. Another type of individual module is a logic individual module, which uses a logic circuit or uses a microcomputer to produce digital input and output signals from digital input information.

The invention has recognized that the distributed control units with the identical individual modules achieve a great advantage through the component-sharing concept. In addition, control unit components which frequently fail, for example, can be provided on a separate individual module, so that in the event of a fault only this individual module needs to be replaced. Despite the great variation and diversity as a result of the different control tasks, identical individual modules are thus used in the different control units. The different functions are implemented by software programs running, by way of example, on identical logic individual modules and on the different control units. The inventive solution significantly increases the number of components for the identical individual modules, since each of these individual modules is used in most of the control units for the means of transport. The distributed control-unit design results in a high level of flexibility for covering the vehicle-specific requirement for digital and/or analogue inputs and outputs in every installation space in the means of transport. The modular principle allows simple extension. In addition, the invention allows automated fitting of the individual modules in the various installation spaces in the means of transport.

Between the various control units there is a universal, high-speed, digital data bus. Such data buses can be provided on the basis of the CAN, Firewire, MOST or FlexRay standard. At the node point for these digital data buses there is a respective signal-converter individual module, as a transmission/reception unit for the distributed control unit, so to speak, which converts the messages from the data bus into messages for the internal data bus in the distributed control unit. In addition the messages are respectively allocated to the corresponding individual modules. The signal-converter individual module performs respective separation into the installation-space-specific data. By way of example, multimedia data or telematics data can be separated from control data for the vehicle interior, such as seat control, light control, inter alia.

The internal data bus connects the signal-converter individual module to further individual modules in a respective control unit. As individual modules, it is possible to connect output-stage individual modules, logic individual modules or analogue individual modules to the signal-converter individual module. Instead of the conventional control unit with a large number of inputs and outputs, use is now made of a respective distributed control unit having a plurality of individual modules which are also used in the other control units. Besides the interfaces to the internal data bus, the individual modules each have just very few additional inputs and outputs and can be connected in series through coupling to the internal data bus. This allows the specific requirement for inputs and outputs on each installation space to be covered without any need to provide a very large number of inputs and outputs on the individual module. This has the advantage that the probability of failure is significantly lowered for the coupling interfaces of the individual modules, since there are few plug connectors and interfaces. The multiple use of identical individual modules in the various control units reduces the diversity of variants while simultaneously increasing the individual modules which need to be produced for a means of transport with the same components. This results in a reduction in the costs for the electronics as a result of the component-sharing concept. In addition, in the event of a fault, it is not necessary to replace the complete control unit, but rather only the respective faulty individual module. A motor vehicle designed on the basis of this concept can also be extended later by new added and special functions without the need to retrofit new control units or data lines. In this case, a further individual module, for example an output-stage individual module, is merely coupled to the internal data bus, and new software for driving the retrofitted component is loaded onto an already existing logic individual module. In this way, it is possible to retrofit a new component, for example a component which was not yet known when the means of transport was manufactured, within the means of transport without changing the control unit.

The output-stage individual module preferably has a printed circuit board on which a transmission/reception interface for the internal data bus and at least one output stage for driving an actuator are provided. In addition, the printed circuit board can also hold a connector for the actuator which is to be driven. A logic individual module likewise has a printed circuit board on which a transmission/reception unit for the internal data bus and a circuit for processing digital data signals for controlling a technical component are provided. In this regard, the logic individual module can have a logic circuit made up of integrated circuits (TTL gates, field-programmable gate array circuit) or a customer-specific ASIC circuit or a popular microcontroller which -respectively executes the actual control programs. In addition, the logic individual module holds the memory means and driver means in order to permit smooth calculation of the control algorithms.

In one particularly preferred development of the data bus system, a plurality of individual modules in the distributed control units have a respective flexible printed circuit which is mounted within a provided installation space in the region of the technical component which is to be controlled. It is also possible to fit all the individual modules to a floppy printed circuit and to mount them within the vehicle on the chassis or on the actuator which is to be controlled. In the simplest case, the floppy printed circuit for an individual module can easily be mounted externally on the electric motor in the manner of an adhesive strip. Any other detachable and non-detachable connections for the floppy printed circuit on the chassis of the means of transport are also conceivable, however.

A special analogue individual module can be provided on a separate floppy printed circuit which has a transmission/reception interface for the internal data bus and analogue driving means for sensors and light-current actuators. By way of example, a vehicle display can be driven using such an analogue individual module. On the other hand, it is also possible to plug on a sensor on the analogue individual module, with the analogue sensor signals, such as a temperature value, being processed by the analogue individual module and output onto the internal data bus in order then to be used in a logic individual module for the control tasks for an actuator.

Besides the internal data bus, there can also be a power data bus between the individual modules for the purpose of respectively supplying them with power. Each individual module then has a connection for the internal data bus for coupling to one another and to the signal-converter individual module and a second data bus connection for the power data bus. In the event of a fault, the individual modules are simply replaced by a new individual module, and the corresponding software can either be transmitted via the data bus or flashed onto the individual module from the outside in the provided memory area. In this case, the flash operation is the transmission of data from an external service station to memory means in the individual module.

The distributed control unit based on the present invention can be used across module series and can easily be extended by serially connecting the individual modules to the internal data bus in the control unit. On account of the individual modules being identical for a plurality of control units, today's large number of different electronic parts for each entire vehicle is reduced. Implementation in floppy technology allows the individual modules to be put flexibly even in the smallest installation spaces in the chassis. The signal-converter individual module in each control unit undertakes conversion of the external bus signals from the high-speed data bus in the means of transport into the message protocol for the internal data bus within the individual control unit. The internal data bus can be a single-wire data bus or else a multi-wire data bus providing four digital input and output lines, for example. The bus signals are respectively forwarded within the distributed control unit via the internal data bus and are thus available to the next individual module on the internal data bus.

Each individual module has additional inputs and outputs for sensors or actuators with normalized levels such that the sensors, e.g. user interfaces or door-contact switches, or actuators, e.g. light-emitting diode lamps or window-lifter motors, can be driven. For power electrics, such as the window lifter, the digital output signal from a digital individual module is used as an input signal for the output-stage individual module and is amplified therein such that the actuator can be driven. Each control unit comprises at least two different individual modules, namely a digital individual module and an output-stage individual module. Simply lining up the individual modules on the internal data bus allows subsequent extension, reduction or modification of the special equipment in a vehicle. Any maintenance and repair costs are lower, since only the faulty individual module needs to be tested and replaced in each case. The high-speed data bus within the vehicle is routed into the various installation spaces within the means of transport. In the installation spaces, the distributed control unit can be mounted at various points. It is also possible for the signal-converter individual module to be provided just at the node point, and the other individual modules can be installed in other installation spaces in the vehicle. The high-speed data bus can be a multimedia data bus or a telematics data bus, which means that the individual modules can also be arranged within a radio, a navigation system or a driver information system.

BRIEF DESCRIPTION OF THE DRAWING

There are now various options for refining and developing the theory of the present invention in an advantageous manner. To this end, reference can first be made to the subordinate claims and secondly to the explanation of an embodiment below. The drawing shows an embodiment of the inventive data bus system, where, in each case in the schematic illustration.

DETAILED DESCRIPTION OF THE DRAWING

Figure 1:
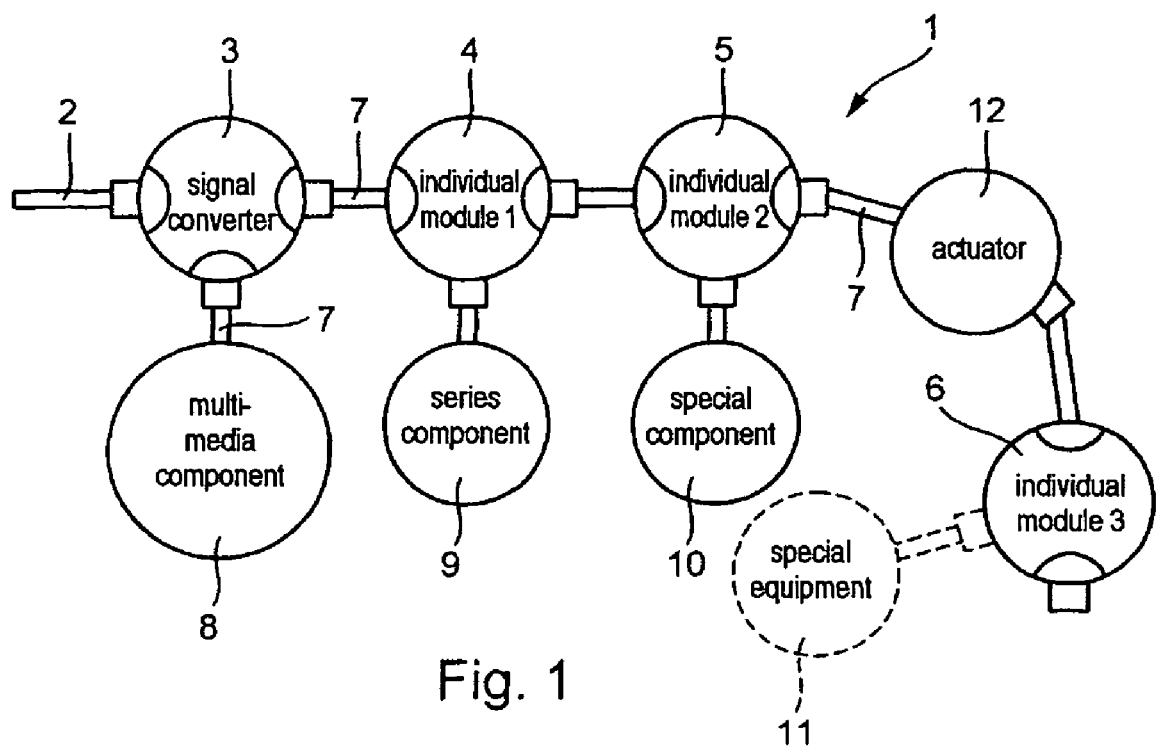
FIG. 1 shows a basic illustration of the data bus system having a control unit distributed over a plurality of individual modules in accordance with the present invention.

The data bus system has a plurality of distributed control units 1 which communicate with one another via a data bus 2. Such a data bus 2 can be a "MOST data bus", which is used to transmit messages in optical form. The data bus 2 can alternatively be a Firewire, a CAN, a FlexRay or another data bus from transport technology. The distributed control unit 1 is made up of various individual modules 3–6 which are networked to one another via an internal data bus 7. In contrast to the transport data bus 2, the internal data bus 7 is provided merely for interchanging the data within the control unit 1 and is in a form such that the internal data bus 7 can easily be extended by further individual modules 3–6. To this end, the internal data bus 7 can automatically recognize the number of individual modules 3–6 and can permit appropriate addressing of the individual messages to the appropriate individual modules 3–6 using its data bus protocol.

The signal-converter individual module 3 receives the messages arriving from the data bus 2 from the other control units 1, buffer-stores them, splits the messages according to the individual module 3–6 in question and transmits the split messages to the respective individual module 3–6. The signal-converter individual module 3 can additionally have a logic circuit and/or an output for driving a multimedia component 8 which is likewise coupled to the signal-converter individual module 3 via the internal data bus 7. The individual module 4 in the distributed control unit 1 is provided for controlling the series components 9, that is to say can be used for the window lifter and the seat-adjustment switch, for example. The individual module 5 connected to the other individual modules 3, 4, 6 via the internal data bus 7 is provided for driving the special components 10, these being able to be components of the passenger area, of the doors and mirrors. These can be the mirror adjustment or a closing aid for the door or boot cover, for example. Also coupled to the internal data bus 7 is the individual module 6 for controlling the special-equipment component 11. This can also be a special-equipment component 11 which is not intended to be fitted in the vehicle until later, that is to say after the vehicle has been delivered. There is also an actuator 12 arranged on the internal data bus 7 and between the individual modules 3–6, this being able to be an electric motor or a display, for example. The individual modules 3–6 are networked via the local data bus 7 such that they can be fitted in a respectively different installation space within the means of transport. By way of example, the data bus 2 can be put within the motor vehicle door and the data bus 7 coming from the signal-converter individual module 3 can have provision for a first individual module 4 to be put in the surroundings of active loudspeakers, for a second individual module 5 to be put in the region of a lane-change camera and for the individual module 6 to be put in the vicinity of a display 12. Alternatively, the internal data bus 7 allows the individual modules 3–6 to be put in the roof, close to an antenna, within the seats or else in the region of the boot.

The data bus 2 is put into the installation spaces, and at the respective node point for the data bus 2 there is the signal-converter individual module 3, which converts the messages from the data bus 2 into individual messages associated with the individual modules 3–6. Since the invention uses the individual modules 3–6 within a plurality of control units 1, i.e. the hardware of the individual modules 3–6 is used in an identical design a plurality of times, a component-sharing concept arises which reduces the different designs of the various control units within a means of transport. The result is universal individual modules 3–6 which can be used a plurality of times and essentially differ only in the loaded software with the application programs.

Figure 2:
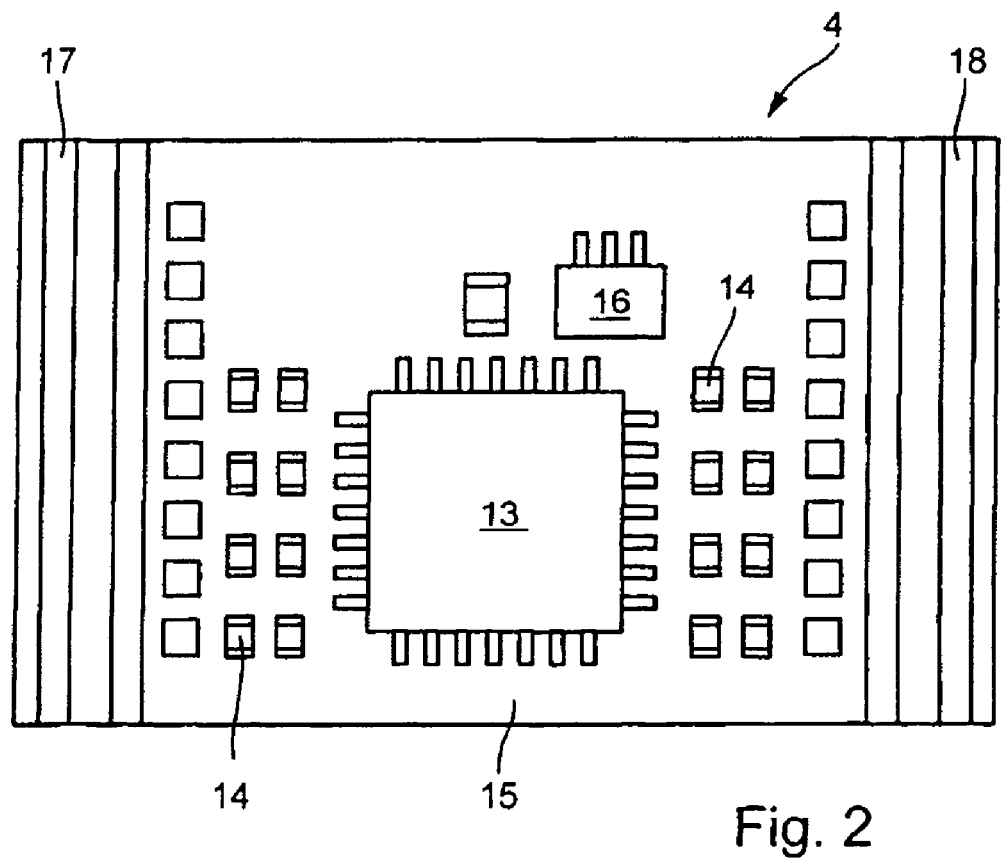
FIG. 2 shows the plan view of a logic individual module in accordance with the present invention.

FIG. 2 shows an individual module 4 which is in the form of a "logic individual module" on a flexible floppy printed circuit. A microcomputer 13 and various SMD components 14 are arranged on the floppy printed circuit 15. A switching transistor 16 is provided for the purpose of directly driving the series components 9. The conductor tracks 17 are provided for the purpose of making contact with the series components 9 which are to be driven, and the conductor tracks 18 transmit the data bus signals on the internal data bus 7 to the microcomputer 13. The floppy printed circuit 15 is flexible and can therefore be arranged and fitted at any desired location within the means of transport. The floppy printed circuit 15 can be in the form of a multilayer floppy printed circuit on which the individual components 13, 14, 16 are arranged within the floppy printed circuit 15, which means that the components cannot be seen from the outside with the naked eye. The floppy printed circuit 15 with the individual module 4 can then be fitted, for example bonded on, in the form of an adhesive strip in the installation space, for example within a door.

Figure 3:
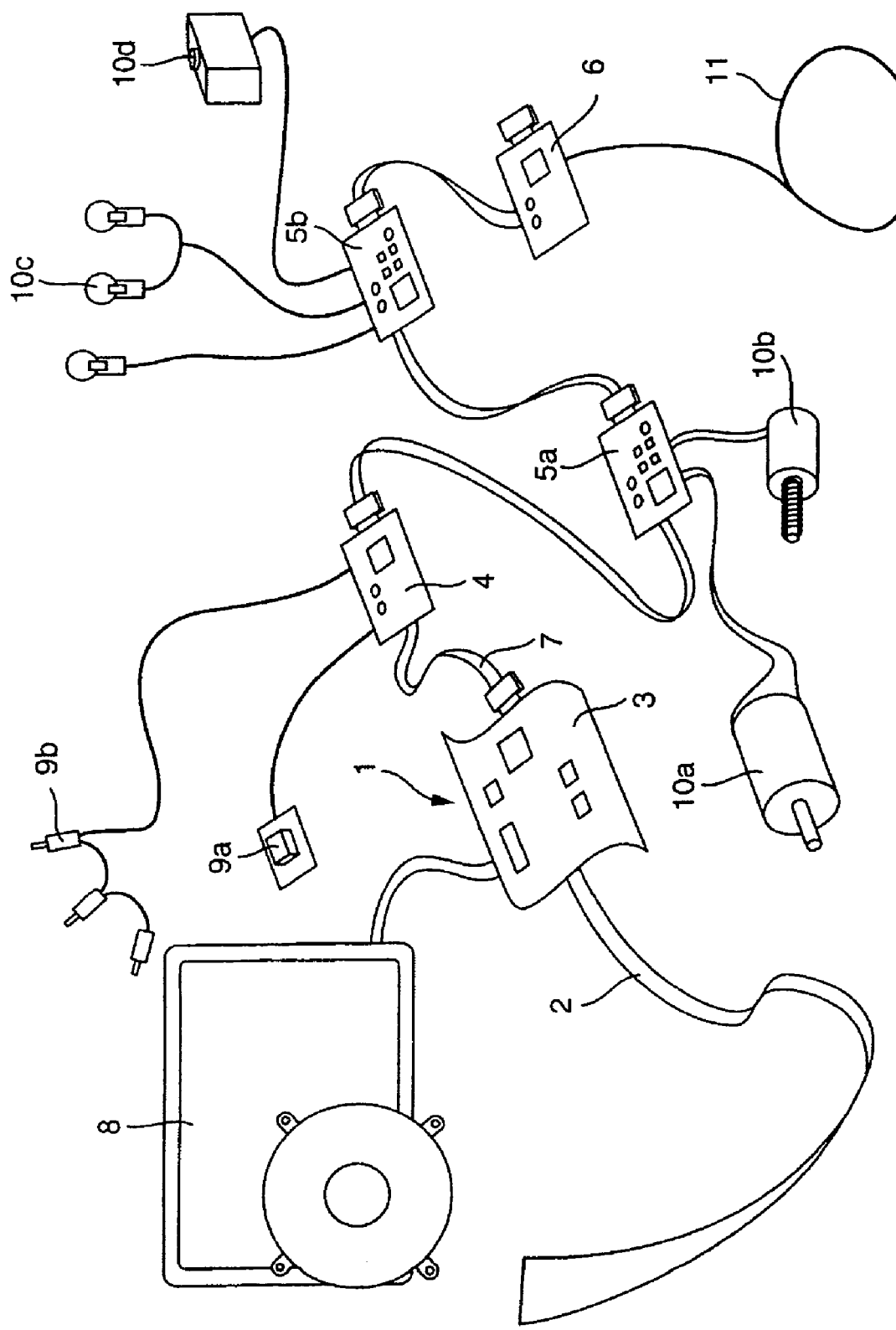
FIG. 3 shows an illustration of part of the data bus system having a distributed control unit comprising a plurality of individual modules and the sensors and actuators connected thereto.

FIG. 3 shows the practical implementation of the inventive distributed control unit 1 for a motor vehicle. A high-speed data bus 2, for example an optical CAN, Firewire, MOST data bus printed on a floppy line for supplying power, has a signal-converter individual module 3 coupled to it which uses the internal data bus 7 to allocate the signals and messages to the individual modules 4, 5 and 6. The individual module 5 is represented twice in identical form 5a and 5b, and the differing software in the respective microcomputer 13 makes it suitable for driving different components. The signal-converter individual module 3 has, as a multimedia component 8, a loudspeaker unit coupled to it which receives the appropriate data in analogue or digital form from the signal-converter individual module 3. To this end, the multimedia component can be equipped with a digital amplifier which drives the loudspeaker. The individual module 4 drives the series components 9a, i.e. a relay or control button, and 9b, i.e. a plurality of control adjustors or knobs. The two individual modules 5a and 5b are in identical form in terms of the hardware. They are "output-stage individual modules", as can be found, in line with the invention, in a plurality of control units 1 in the inventive data bus system. The output-stage individual module 5a, as an actuator, drives an electric motor or door closing-aid magnet 10a and an electric motor 10b, while the output-stage individual module 5b drives a plurality of lamps 10c for a display unit and has a coupled filling-level meter or servomotor 10d for detecting the filling level or adjusting the exterior mirror. The individual information is processed within the distributed control unit 1 and is used for driving the actuators, i.e. the electric motors for the lamps and the control units. A logic individual module 6 is connected to the other individual modules 4, 5a, 5b via the internal data bus 7 and is coupled to a reception antenna 11, which can in turn be used for operating a radio or for an access authorization system for the means of transport.

In line with the invention, the individual modules 4, 5a, 5b and 6 are fitted in different control units 1 a plurality of times within the data bus system. As a result, the component-sharing concept is increased within the means of transport and faulty individual modules 3–6 can be replaced by an individual module 3–6 having identical hardware without any difficulty. Only the software need then be transmitted to the individual module either via the data bus 2 and the internal data bus 7 or the software can be transmitted to a "flash memory" from the outside, so that the substitute individual module is operational again for controlling the associated components. The present invention reduces the components used within a means of transport and contributes to enhanced modularization within the vehicle. In this way, spares components can continue to be available even after many years of the means of transport being in operation, since the increased component-sharing provision of the individual modules allows spares to be provided economically over many years in a technically simplified manner.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A data bus system having a plurality of control units which interchange messages with one another via a data bus and which are provided for controlling components, the individual control units being of modular design and being fitted in different installation spaces in a technical product, wherein the control units are designed as distributed control units having individual modules a plurality of which can be arranged independently of one another and some of which are connected via an internal data bus, and the individual modules in a control unit produce data and signals for driving the same component/components with individual modules identical in terms of hardware being provided in different control units, and in that at least two different types of individual modules are provided in a plurality of control units, with one output-stage individual module provided in a plurality of control units being provided for the purpose of driving actuators and another logic individual module using a logic circuit or a microcomputer to produce digital input and output signals from digital information.

2. The data bus system according to claim 1, wherein the output-stage individual module has a printed circuit board on which a transmission/reception interface for the internal data bus and at least one output stage for driving an actuator are provided.

3. The data bus system according to claim 1, wherein the logic individual module has a printed circuit board on which a transmission/reception interface for the internal data bus and a circuit for processing digital data signals for the purpose of controlling a technical component are provided.

4. The data bus system according to claim 1, wherein the printed circuit board is a flexible floppy printed circuit which is mounted within a provided installation space in the region of the technical component which is to be controlled.

5. The data bus system according to claim 1, wherein an analog individual module is provided on a separate printed circuit board which has a transmission/reception interface for the internal data bus and analogue driving means for sensors and light-current actuators.

6. The data bus system according to claim 1, wherein a signal-converter individual module is provided which converts the messages from the data bus into messages for the internal data bus and allocates the messages for the respective appropriate individual modules.

7. The data bus system according to claim 1, wherein a power data bus is also provided which respectively supplies the individual modules with power.

8. A data bus system, comprising:
 a first control unit comprising a first set of individual control modules for respectively controlling a first set of components, wherein the individual control modules of the first set are substantially identical in terms of hardware but different in terms of software; and
 a second control unit comprising a second set of individual control modules for respectively controlling a second set of components, wherein the individual control modules of the second set are substantially identical in terms of hardware but different in terms of software.

9. The data bus system of claim 8, wherein each of said individual control modules of said first set comprises a microcomputer.

10. The data bus system of claim 8, wherein each of said individual control modules of said first set comprises a switching device to selectively drive one or more corresponding components.

11. The data bus system of claim 8, wherein said first control unit comprises an internal data bus coupled to said first set of individual control modules.

12. The data bus system of claim 8, wherein at least one of said first set of components comprises a window lifter of a vehicle.

13. The data bus system of claim 8, wherein at least one of said first set of components comprises a seat-adjustment device of a vehicle.

14. The data bus system of claim 8, wherein at least one of said first set of components comprises a closing device for a door of a vehicle.

15. The data bus system of claim 8, wherein at least one of said first set of components comprises an adjustment device for an electric mirror of a vehicle.

16. The data bus system of claim 8, wherein at least one of said first set of components comprises an actuator.

17. The data bus system of claim 8, wherein said first control unit comprises a signal converter to receive a command, buffer said command, and transmit said command to at least one of said first set of individual control device.

18. The data bus system of claim 17, wherein said first control unit comprises a multimedia device coupled to said signal converter.

19. The data bus system of claim 8, further comprising a data bus coupled to said first and second control units.

* * * * *